United States Patent [19]

Games et al.

[11] 3,831,010

[45] Aug. 20, 1974

[54] AREA NAVIGATION COMPUTER

[75] Inventors: John E. Games, Granby; Clarence Casper, Jr., Windsor; Bertram F. Kupersmith, Bloomfield, all of Conn.

[73] Assignee: United Aircraft Corporation, East Hartford, Conn.

[22] Filed: June 4, 1973

[21] Appl. No.: 367,070

[52] U.S. Cl........ 235/150.27, 235/150.26, 235/189, 307/261, 328/167
[51] Int. Cl............................................. G06f 15/50
[58] Field of Search....... 235/150.2, 150.26, 150.27, 235/189, 197; 307/261; 328/28, 167; 343/112 C, 112 D

[56] References Cited
UNITED STATES PATENTS

| | | | |
|---|---|---|---|
| 3,097,357 | 7/1963 | Durnal...................... | 235/150.27 X |
| 3,534,399 | 10/1970 | Hirsch........................... | 235/150.27 |
| 3,581,073 | 5/1971 | Visher........................... | 235/150.26 |
| 3,633,043 | 1/1972 | Anthony........................... | 307/230 |
| 3,659,291 | 4/1972 | Anthony................ | 235/150.27 UX |
| 3,750,942 | 8/1973 | Bean.............................. | 235/150.27 |

*Primary Examiner*—Malcolm A. Morrison
*Assistant Examiner*—Jerry Smith
*Attorney, Agent, or Firm*—M. P. Williams

[57] ABSTRACT

Digital signals relating to the north reference and variable phase components of the output of the VOR receiver are used along with slant range corrected output of distance measuring equipment to generate a synthetic, stepped sinewave representing the phasor from the VOR ground station to the aircraft. Stored digital waypoint distance (Rho) and bearing are combined with north reference signals to generate a synthetic, stepped sinewave representing the phasor of the VOR to a selected waypoint. The aircraft phasor is subtracted from the waypoint phasor and the resultant passed through a low pass filter, thereby providing a sinewave, the amplitude of which represents the distance from the aircraft to the waypoint and the phase of which represents the bearing of the aircraft track to the waypoint with respect to north, which comprises the phasor, or vector, to the waypoint. This phasor is resolved into X and Y components (arbitrarily with respect to north) each component then being constant slew rate filtered, and, with north reference signals, synthetic phasors are recreated, summed and filtered so as to provide a slew rate filtered phasor representing the vector from the aircraft to the waypoint, the magnitude of which is used to drive a distance to waypoint indicator, the phasor being combined with OBS track angle information to provide cross track error and to/from indications.

4 Claims, 11 Drawing Figures

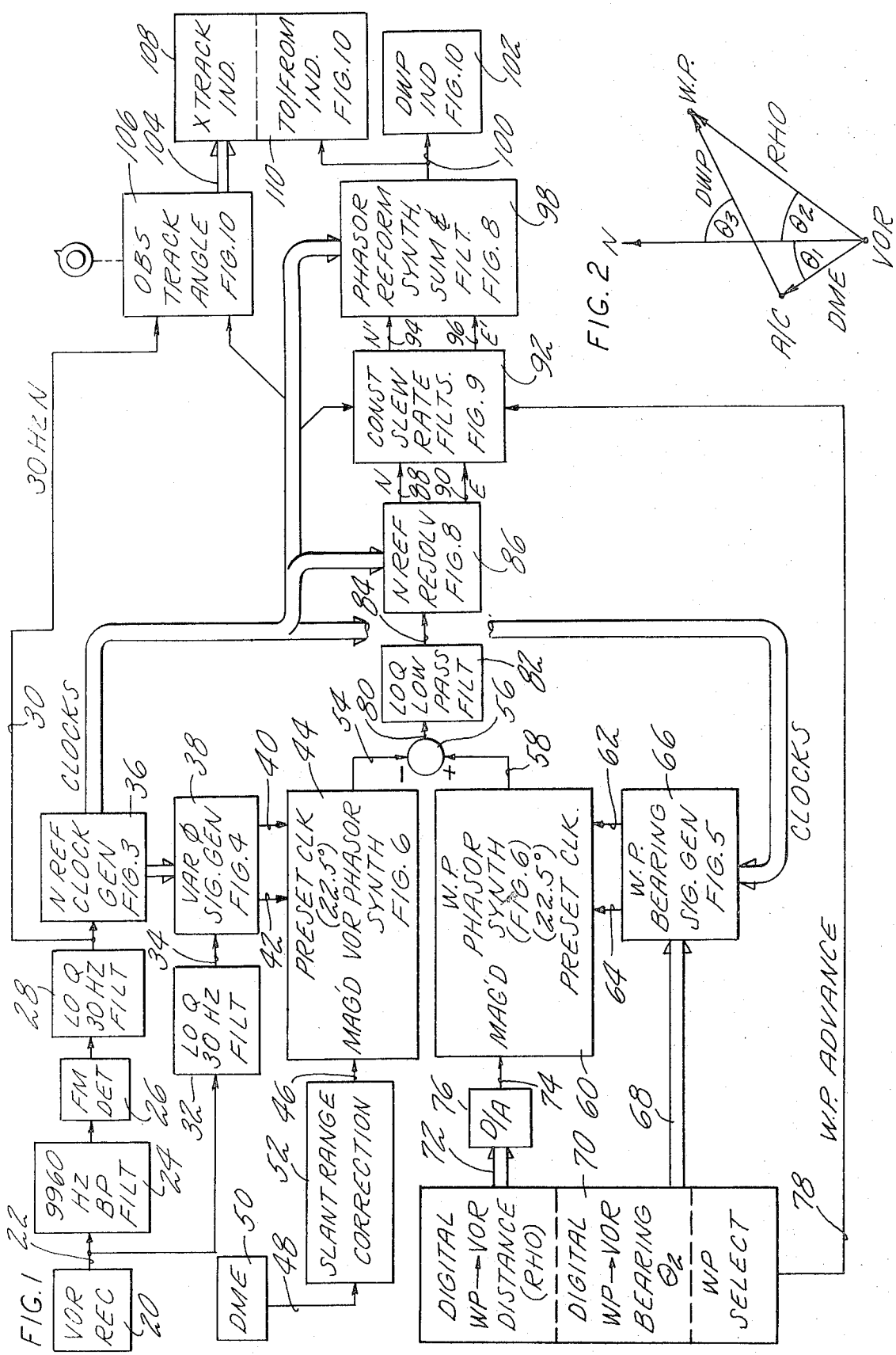

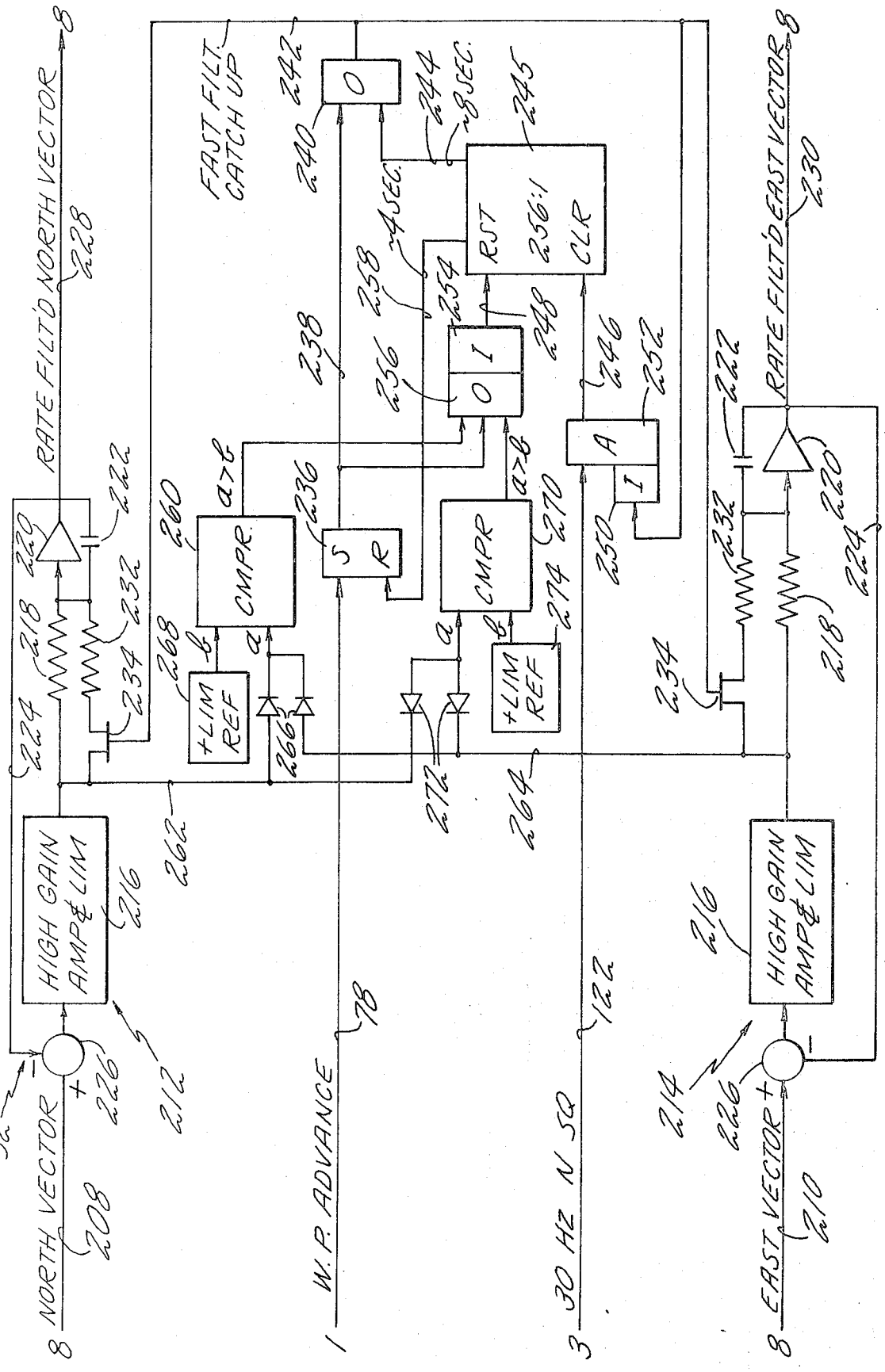

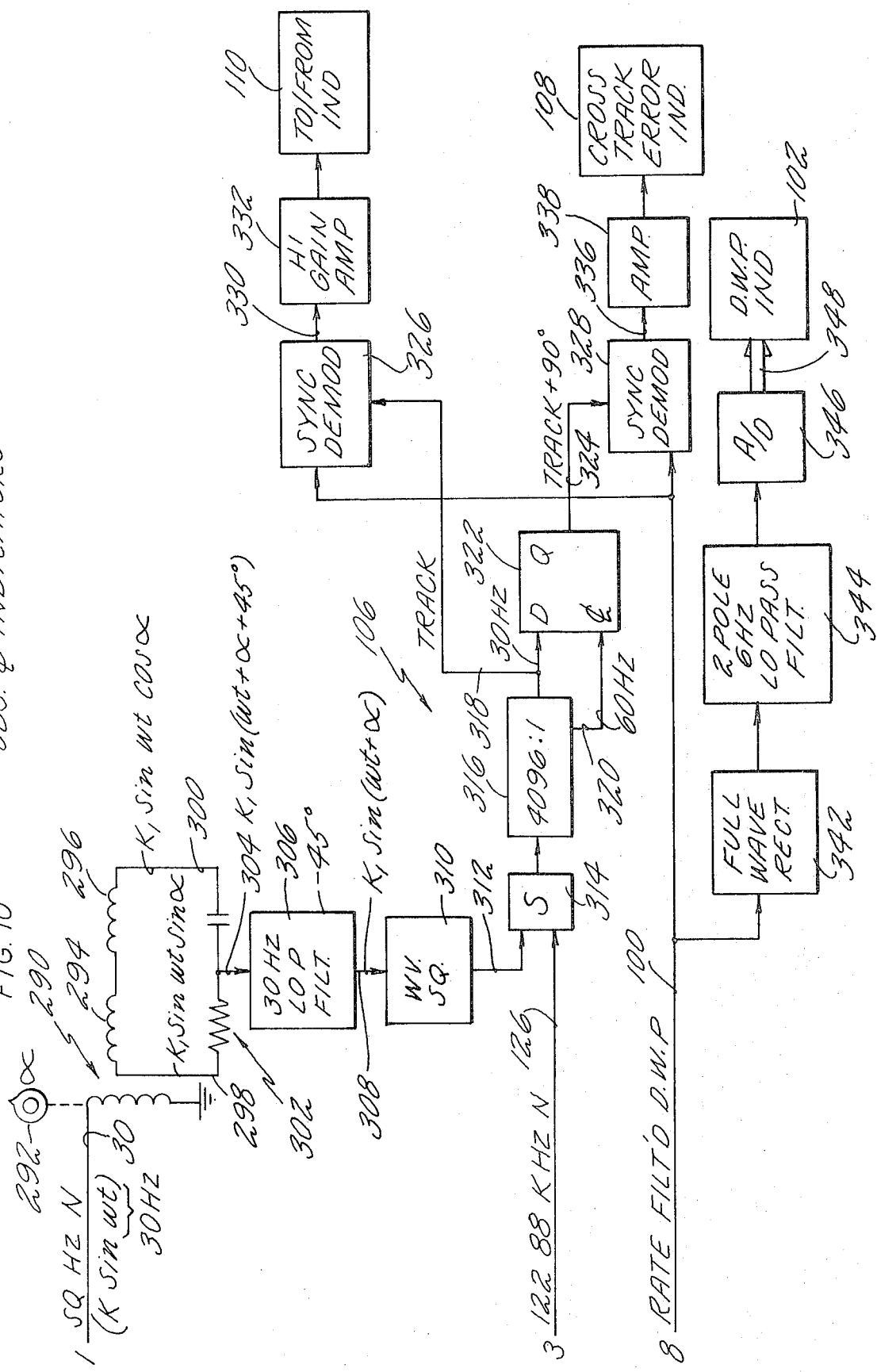

AREA NAVIGATION COMPUTER

BACKGROUND OF THE INVENTION

1. Field of the Invention

This invention relates to area navigation computers, and more particularly to an area navigation computer employing vector summation and constant slew rate filtering.

2. Description of the Prior Art

A recent advance in area navigation computers comprises the utilization of constant slew rate filtering so as to eliminate scallops, noise and other unwanted components from the signals received from a VOR ground station and its related distance measuring equipment. However, computers of this type known to the art have provided distance and bearing of the aircraft to the ground station in X and Y coordinates for slew rate filtering, in order to provide the slew rate filtering purely on a distance basis, rather than on a basis of angle plus distance. This results in having the distance and angle to the waypoint also processed separately in X and Y coordinates, the X and Y coordinates of the aircraft to ground station vector and the X and Y coordinates of the waypoint to ground station vector being summed (X coordinates summed together and Y coordinates summed together), the resolution taking place with respect to North-East axes typically. Such a computer is unduly complex and is therefore expensive and subject to greater failure. Furthermore, such a device requires extensive use of band pass filters, which introduce phase shifts that vary with temperatures; when the equipment becomes complex, it must be located in an equipment bay not subject to environmental control, whereby the opportunity occurs for great variations in phase errors introduced by filtering.

Another type of area navigation computer of recent design is much simpler than the aforementioned type, using analog vector summations to avoid the necessity of processing signals in X and Y coordinate form. However, rate filtering in vector summation computers known to the art is limited simply to filtering of the aircraft bearing to the VOR ground station, which filtering has a wide range of effect on dependence upon the distance of the aircraft to the ground station. For instance, if a small amount of filtering is used, then at large distances great errors can result since the filter does not sufficiently remove scallops and other unwanted components; on the other hand, if the signal is heavily filtered, thereby to avoid unwanted components at large distances, while the aircraft is flying close to a VOR station, the angle indicated at the output of the filter lags the true angle sufficiently so that significant error is introduced. Thus, although such a vector summation computer is far simpler than a coordinate computer of the type described hereinbefore, the filtering cannot be properly applied. In addition, computers of this type known to the art also require extensive use of band pass filters which provide phase errors as a function of temperature and other changes, thereby introducing further errors into the system.

SUMMARY OF INVENTION

The object of the invention is to provide an improved, highly accurate electronic area navigation computer.

According to one aspect of the present invention, the utilization of band pass filters is mitigated by means of synthetic, stepped sinewave generation of phasors representing vectors of the aircraft to the ground station and of a desired waypoint to the ground station, the vector summation of which, having only extremely high-ordered harmonic content, can be passed through a simple low pass filter. According further to one aspect of the present invention, phasors representing vectors of the position of an aircraft and a waypoint to a VOR station are vector summed, are then resolved into X and Y coordinates for constant slew rate filtering on a purely distance basis, and reformed to provide a constant slew rate filtered phasor representing the vector of the aircraft to the desired waypoint.

In accordance with another aspect of the present invention, a constant slew rate filter for processing a pair of orthogonal vectors representing resolved distances includes a fast catch up mode operated in response to a single timer, indicating that either of the vectors is changing more rapidly than the rate permitted by the respective filter, to significantly decrease the time constant of the integrator in both filters, thereby to allow the filters to catch up to the rapid change.

In accordance further with the second aspect of the present invention, a constant slew rate filter has a fast catch up mode which can be activated when changing from one waypoint to another, whereby the filter can be utilized downstream of the summation of the aircraft/VOR vector with the desired waypoint/VOR vector, without limiting the ability of an area navigation computer to respond rapidly to changes in waypoint.

The present invention, by using synthetic sinewave generation to provide phasors representing vectors to the VOR station, eliminates the need for certain band pass filters and the concomitant errors introduced thereby. The present invention permits vector summations for simplicity of hardware together with constant slew rate filtering of resolved components of distance, which provides filtering which is constant at any distance from the ground station, thereby to eliminate VOR errors without introducing filtering errors. The invention provides improved constant slew rate filtering utilizing but a single timer, and further provides slew rate filtering with forced catch up mode to permit usage in filtering vectors which may have stepped function changes provided therein.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a simplified schematic block diagram of an area navigation computer in accordance with the present invention;

FIG. 2 is a vector diagram illustrative of area navigation computations performed by the present invention;

FIG. 9 is a schematic block diagram of a constant slew rate filter in accordance with the present invention;

FIG. 10 is a simplified schematic block diagram of OBS resolution and indicators for use in the embodiment of FIG. 1; and FIG. 11 is a schematic of an exemplary synchronizer circuit.

DESCRIPTION OF THE PREFERRED EMBODIMENT

Figure 3:
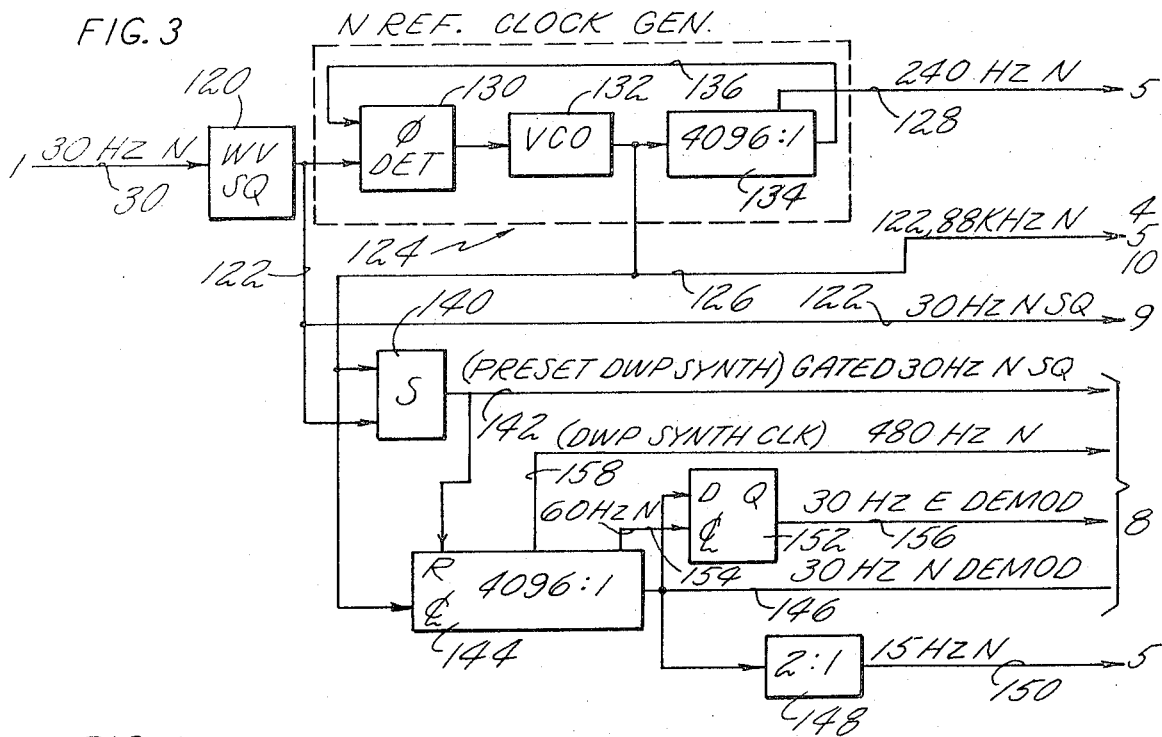
FIG. 3 is a schematic block diagram of a north reference clock generator for use in the embodiment of FIG. 1.

Referring now to FIG. 1, a VOR receiver 20, of any well known type, provides a signal on a line 22 which includes a 9,960 Hz carrier which is FM modulated at 30 Hz, the 30 Hz FM comprising a reference phase relating to true north. The signal on the line 22 also includes a 30 Hz AM modulation, the phase of which is delayed by 0° to 360° to indicate the angle of transmission of the VOR station to the VOR receiver 20. In other words, the phase difference between the 30 Hz FM and the 30 Hz AM is equal to the bearing ($\theta_1$, FIG. 2) of the aircraft to the VOR ground station.

The signal on the line 22 is passed through a 9,960 Hz band pass filter 24, a conventional FM detector 26, and a low Q 30 Hz filter 28 so as to provide a 30 Hz north reference signal on a line 30. The signal on the line 22 is also passed through a low Q 30 Hz filter 32 so as to provide a 30 Hz variable signal on a line 34. The 30 Hz north signal on the line 30 is applied to a north reference clock generator circuit 36, the details of which are described hereinafter with respect to FIG. 3. Certain of the north reference clock signals are applied to a variable phase signal generator 38 which in turn provides a clock signal on a line 40 and a preset signal on a line 42 to a VOR phasor synthesizer circuit 44, the details of which are described with respect to FIG. 6, hereinafter.

The clock and preset signals on the lines 40, 42 control the phase of a synthetic, stepped sinewave generated in the VOR phasor synthesizer 44. The magnitude of the sinewave generated therein is determined by the magnitude of a signal on a line 46 which comprises slant range corrected distance to the VOR ground station (DME, FIG. 2) as derived by the signal output on a line 48 from distance measuring equipment 50 of any conventional type, after being slant range corrected in a conventional slant range correction circuit 52. The output of the VOR phasor synthesizer 44 is applied on a line 54 to a negative input of a voltage summation amplifier 56. A positive input to the voltage summation amplifier 56 is provided on a line 58 from a waypoint phasor synthesizer 60 which provides a synthetic, stepped sinewave, the phase of which is a function of clock and preset signals on a pair of lines 62, 64 which are generated by a waypoint bearing signal generator 66, the details of which are described hereinafter with respect to FIG. 5. The waypoint bearing signal generator 66 responds to a digital word, representing bearing ($\theta_2$, FIG. 2) of the W.P. to the VOR, on a multisignal bus 68 provided by a waypoint storage device 70, which also provides on a multisignal bus 72 a digital manifestation of a distance (RHO, FIG. 2) between a desired waypoint and the VOR station. The distance represented by the digital signals on the line 72 is generated in analog fashion on a line 74 by a digital to analog converter 76 for application as the magnitude input to the waypoint phasor synthesizer 60. The waypoint storage device 70 also generates a waypoint advance signal on a line 78 whenever the selected waypoint is switched from one waypoint to another.

The output of the voltage summation amplifier 56 on a line 80 is passed through a low Q, low pass filter 82 so as to provide on a line 84 a sinusoidal voltage representing the vector summation of the VOR phasor and the waypoint phasor. This is the aircraft-to-waypoint vector, the phase of which represents the angle ($\theta_3$, FIG. 2) of the vector from the aircraft to the waypoint with respect to true north, and the magnitude of which represents the ground distance (D.W.P., FIG. 2) from the aircraft to the waypoint. This vector may fluctuate somewhat as the result of scalloping and other noise components of the VOR angle information, as is known in the art. In order to provide a vector which is relatively stable with respect to angle, constant slew rate filtering is desired.

The signal representing the vector of the aircraft to the desired waypoint on the line 84 is passed to a north reference resolver 86 for resolution into signals on a pair of lines 88, 90 representing north and east coordinates of the vector on the line 84. These are applied to constant slew rate filters 92, the details of which are described with respect to FIG. 9, hereinafter, so as to provide slew rate filtered north and east vector voltages on a pair of lines 94, 96. The filtered north and east vectors on the lines 94 and 96 are reformed into a single phasor by phasor reform synthesis, summation and filtering circuitry 98, the details of which are described with respect to FIG. 8, hereinafter. The output of the circuitry 98 on a line 100 comprises a sinewave phasor, the magnitude of which is the ground distance of the aircraft to the waypoint, and the angle of which is the angle of the track of the aircraft to the waypoint with respect to true north, which is relatively stable because distance-related constant slew rate filtering has been applied thereto. The magnitude of the signal on the line 100 is used to operate a distance-to-waypoint indicator 102, which is shown in more detail in FIG. 10, and the magnitude and phase of the distance-to-waypoint phasor on the line 100 is combined with signals on lines 104 from an OBS track angle resolver 106 so as to provide inputs to a cross track indicator 108 and to a to/-from indicator 110, which are shown in more detail in FIG. 10. Further explanation of the interconnection of the north reference clock generator 36 and various other circuitry illustrated in FIG. 1, as well as overall system operation appears hereinafter following detailed description of the components of the embodiment of FIG. 1.

The north reference clock generator 36, illustrated in detail in FIG. 3, provides a plurality of clocking signals at different frequencies to facilitate gating of the variable phase VOR signal and the waypoint bearing signals so as to determine bearing information therefrom, and as a convenient source for resolving the waypoint vector for slew rate filtering.

Basically, the north reference clock generator arrangement of the present invention accommodates the fact that utilization of the very accurate phasor synthesizers, as described with respect to FIG. 1 hereinbefore, requires a 480 Hz frequency which is very accurately related to the 30 Hz phase of the phasor being generated. However, the multiplication of 30 Hz to 480 Hz cannot be sufficiently accurately controlled without further accommodation. In addition, the north reference signals are utilized, simply for convenience, is a source of signals for resolving the distance-to-waypoint phasor in order to permit slew rate filtering, and for thereafter reforming the filtered phasor. In FIG. 3, the 30 Hz north signal on the line 30 is applied to a wave squaring circuit 120, which may simply comprise a hard limited, high gain amplifier, that produces a square wave in phase with the 30 Hz sinewave on the signal line 30. This produces a 30 Hz north squared signal on a line 122 which operates a phase locked loop 124 that is utilized as a frequency multiplier so as to produce a 122.88 KHz north signal on a line 126 for basic gating purposes, and a 240 Hz north signal on a line 128. The phase locked loop 124 operates in a well known fashion and includes a phase detector 130 which feeds a voltage controlled oscillator 132, the output of which is divided in a 4096:1 counter 134, the output of which on a line 136 is applied to the phase detector 130. In order for the output of the 4096:1 counter 134 to be at the same frequency and a fixed phase relationship (i.e. 0° or 90°) with the 30 Hz north squared signal on the line 122, the VCO 132 has to operate at a frequency which is 4,096 times 30 Hz, thereby providing at its output the 122.88 KHz signal on the line 126. The 240 Hz north signal on the line 128 is derived from a stage in the counter 134 which is four stages from the end.

The 122.88 KHz north signal on the line 126 is used in a synchronizer circuit 140 to synchronize the 30 Hz north squared signal on the line 122 to provide a gated 30 Hz north squared signal on a line 142. This is utilized to clear or reset a 4,096:1 count down counter 144 which is clocked by the 122.88 KHz north signal. The output of the 4,096:1 count down circuit 144 is a 30 Hz north demodulator signal on a line 146, which is passed through a 2:1 counter 148 so as to derive a 15 Hz north signal on a line 150. The purpose of the synchronizing gate 140 in the count down circuit 144 is to provide the 15 Hz north signal on the line 150 very accurately (to within one clock pulse of the 122.88 KHz, which is less than one tenth of a degree). This signal is used to accurately derive the phase related to the bearing of the waypoint from the VOR with respect to true north, as is described in more detail with respect to FIG. 5 hereinafter.

The synchronizer 140 (and similar ones elsewhere herein) may comprise (FIG. 11) a D-type flip flop 151 and a NOR circuit 153, the NOR providing an output during the first part of the negative portion of the 30 Hz signal until the falling edge of the clock causes the flip flop to be reset; then, the NOT Q output goes plus, blocking the NOR. The output of the NOR thus has a trailing edge (used for clearing the count down 142) which coincides with the trailing edge of the 122.88 KHz clock.

The 30 Hz north demodulator signal on the line 146 is used to enable the D input of a D-type flip flop 152 which is clocked by 60 Hz north signal on a line 154, derived from the next to last stage of the 4,096:1 counter 144, so as to produce a 30 Hz east demodulator signal on a line 156 which is 90° advanced from the 30 Hz north demodulator signal on the line 146, in a well known manner. The fifth from last stage of the 4,096:1 counter is tapped to provide a 480 Hz north signal on a line 158. The demodulator signals on the lines 146, 156 are used for resolving the distance-to-waypoint vector in a north reference resolver 86 (FIG. 1) and the signals on the lines 142, 158 are utilized for reforming the vector after slew rate filtering in the phasor reforming synthesizer, sum and filter circuit 98 (FIG. 1), in a manner which is described in detail with respect to FIG. 8 hereinafter. It should be noted that the signals on the lines 142, 158, 156 and 146 are derived this way simply as a matter of convenience; naturally other references for resolving and reforming could be utilized if convenient in any given implementation of the present invention.

Figure 4:
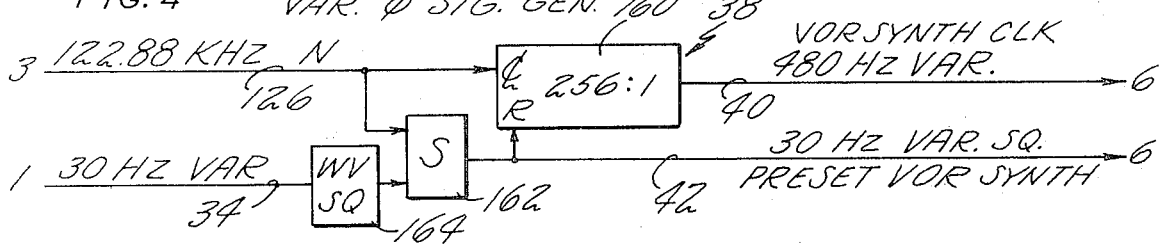
FIG. 4 is a schematic block diagram of a variable phase signal generator for use in the embodiment of FIG. 1.

In FIG. 4, the variable phase signal generator 38 generates the 480 Hz variable signal on the line 40 and the 30 Hz variable squared signal on the line 42 which are used as the clock and preset signals to the VOR phasor synthesizer 44 (FIG. 1). The signal on the line 40 is generated by a 256:1 counter 160 which is clocked by the 122.88 KHz north signal on the line 126 in a manner which is synchronized to the 30 Hz variable signal on the line 34 (from the VOR) by means of a synchronizer circuit 162, the output of which comprises the preset signal on the line 42, which is also utilized to reset or clear the 256:1 counter 160. The 30 Hz variable signal on the line 34 is passed through a wave squaring circuit 164 before being applied to the synchronizer circuit 162.

Figure 6:
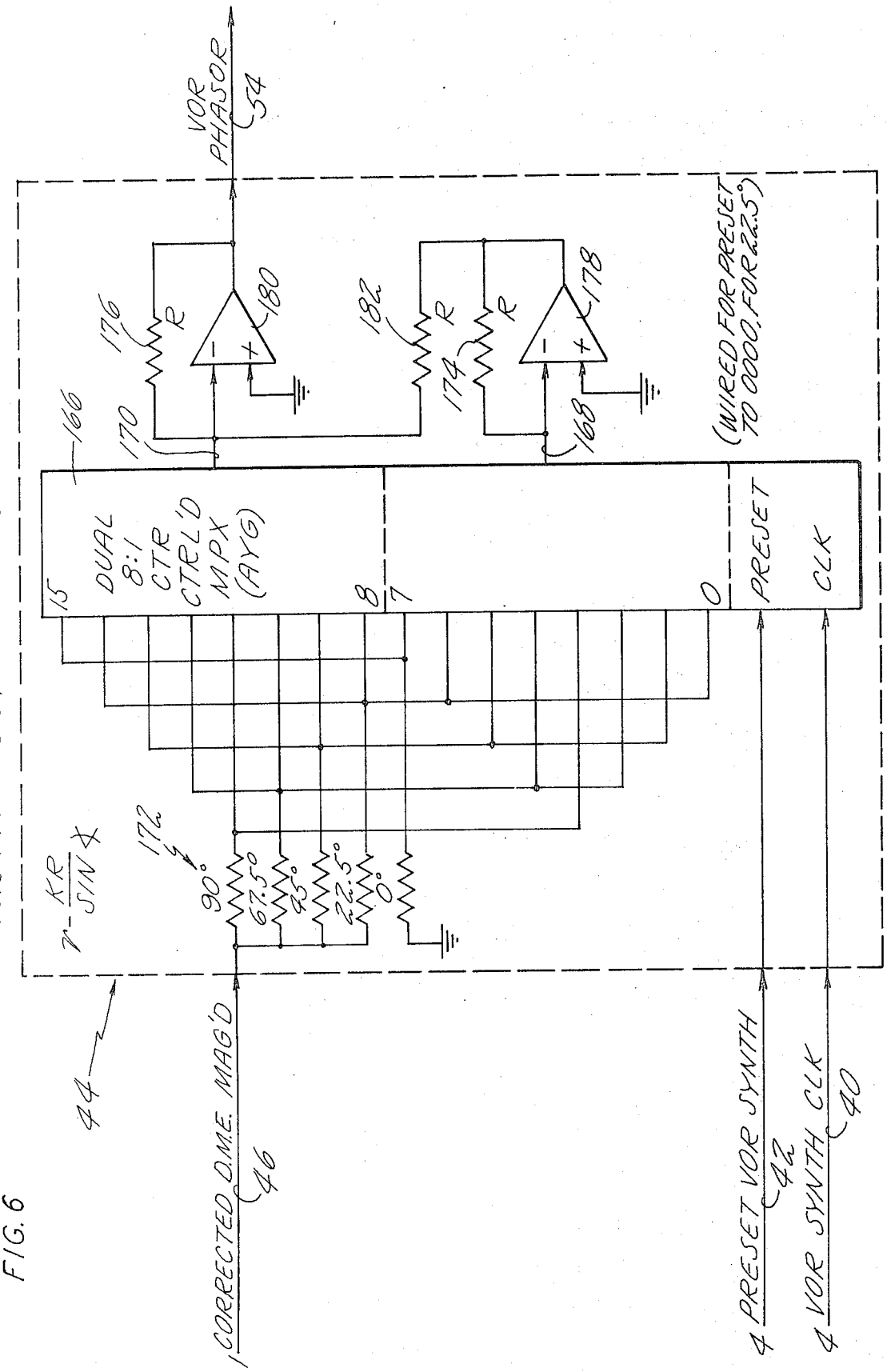
FIG. 6 is a schematic diagram of a phasor synthesizer for use in the embodiment of FIG. 1.
Figure 7:
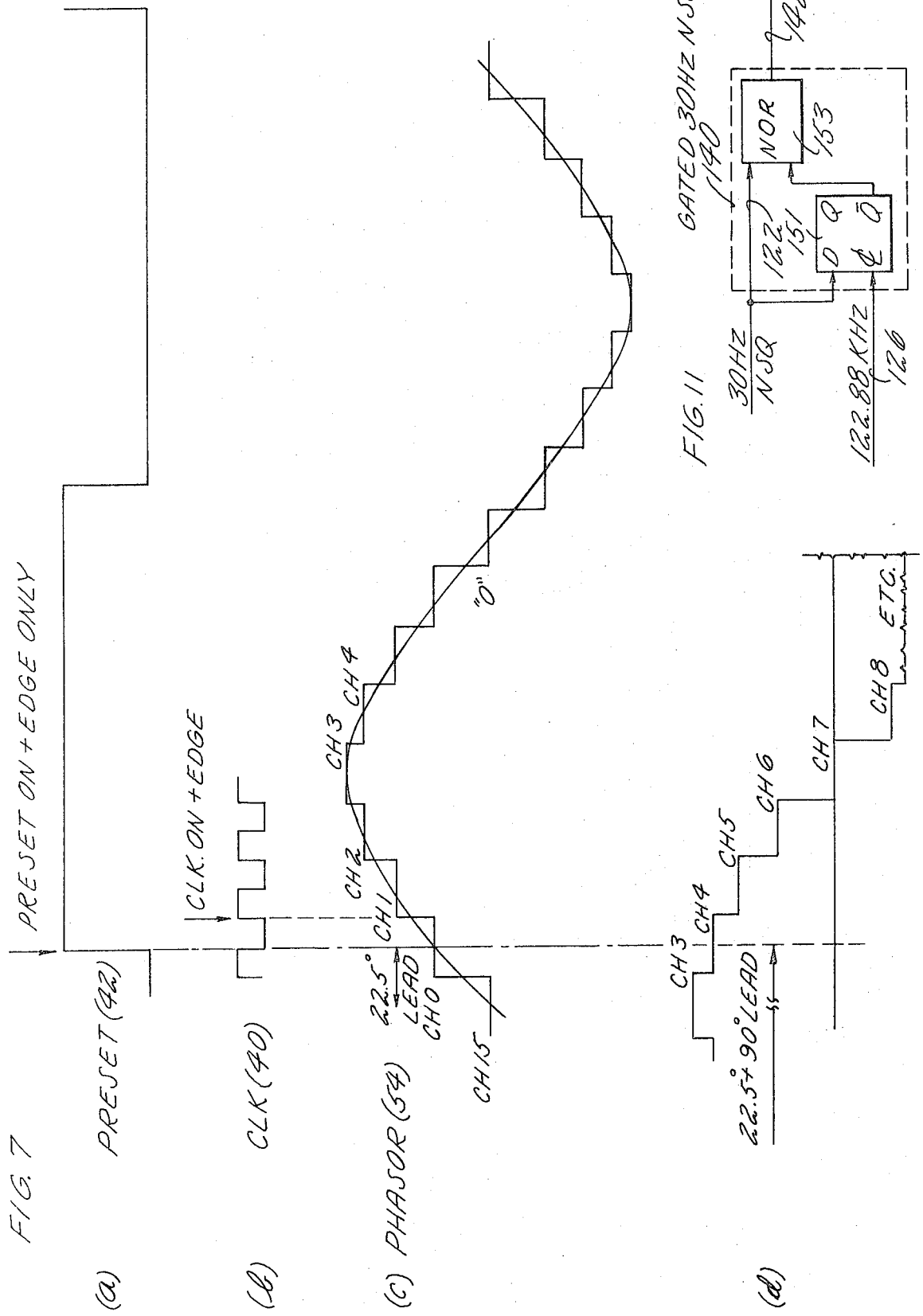
FIG. 7 is a diagram illustrative of the operation of the phasor synthesizer of FIG. 6.

Referring now to FIGS. 6 and 7 the VOR phasor synthesizer 44 receives the slant range corrected distance signal on the line 46, the preset VOR synthesizer signal on the line 42, and the VOR synthesizer clock signal on the line 40, and produces the VOR phasor signal on the output 54. The synthesizer 44 comprises a dual 8:1, counter-controlled multiplex circuit 166, which most conveniently may comprise such a circuit provided in integrated circuit form by General Instruments under the designation AY6-4016, or other equivalent circuitry. The multiplex circuit 166 has a counter which is advanced by clock signals on the line 40; the counter is wired for preset so that any desired number can be established in the counter in response to the rising edge of the signal on the line 42. In the case of the VOR phasor synthesizer, the preset is set to 0000 so as to establish a 22.5° phase lead (as the device is connected), as can be seen with reference to illustration (c) of FIG. 7. The multiplexer 166 has two 8:1 sections, each capable of connecting any one of eight channels to a related output 168, 170. Thus, as the counter rolls from 0 through 7, corresponding channels 0–7 are connected in turn on the output 168, and as the counter rolls from 8–15, it connects respective channels 8–15 to the output 170. Each of the channels is connected to a particular one of several input resistors 172, the resistance of which is related to the resistance, R, of feedback resistors 174, 176 so as to provide gains to operational amplifiers 178, 180 which relate to the sine of the increments of a cycle at 30 Hz, as illustrated in FIG. 7. That is, each of the resistors 172 has a resistance value which is some constant times the value of the resistors 174, 176 divided by the sine of the appropriate angle. Thus, the magnitude of the output of the synthesizer on the line 54 at 90° (plus 22½° lead) will be proportional to the magnitude of the corrected distance signal on the line 46. At other angles, the output magnitude is appropriately diminished so as to synthesize the sinewave in stepped fashion as shown in illustration (c) of FIG. 7. As shown in illustration (c), by presetting the counter for an all-zeros condition, and causing channel zero to be equivalent to 22.5°, a 22.5° phase lead is achieved. This is utilized to offset a 22.5° phase lag provided by the low pass filter 82 (FIG. 1) through which the output of the phasor synthesizers is applied. Because the first half of the sinewave is positive and the second half is negative, and due to the inversion provided by the amplifiers 178, 180, the output of the amplifier 178 is passed through a resistor 182 to the inverting input of the amplifier 180 so that the voltages provided by channels 0–7 at the lead 168 are applied in a positive fashion (double inversion) on the VOR phasor output line 54, whereas the voltages from channels 8–15 are only inverted once and are applied in a negative fashion to the VOR phasor line 54.

Illustrations (a) and (b) of FIG. 7 illustrate the importance of the relationship between the preset signal on the line 42 and the clock signal on the line 40. The counter is preset in response to the positive edge of the preset signal, and is clocked on the positive edge of the clock signal. As is seen in FIG. 4, because the preset voltage on the line 42 is used to reset the 256:1 counter 160 which generates the clock signal on the line 40, the relationship is as shown in illustrations (a) and (b) of FIG. 7. Thus the preset, in a sense, falls in the middle of one of the steps of the sinewave, and the filtered output of the sinewave is essentially that illustrated by the solid line drawn through the center of the steps in illustration (c) of FIG. 7. Thus, since the preset is generated as a countdown from the 122.88 KHz north signal as synchronized with the 30 Hz variable signal, the sinewave generated in the VOR synthesizer is generated with a phase relating to the phase of the 30 Hz variable signal (and therefore the bearing of the aircraft to the VOR ground station) to something on the order of one-tenth of a degree. Similarly, because of the accuracy inherent in the operational amplifiers 178, 180, and input resistors the magnitude of the synthesized phasor sinewave will very accurately reflect the distance to the VOR station.

Figure 5:
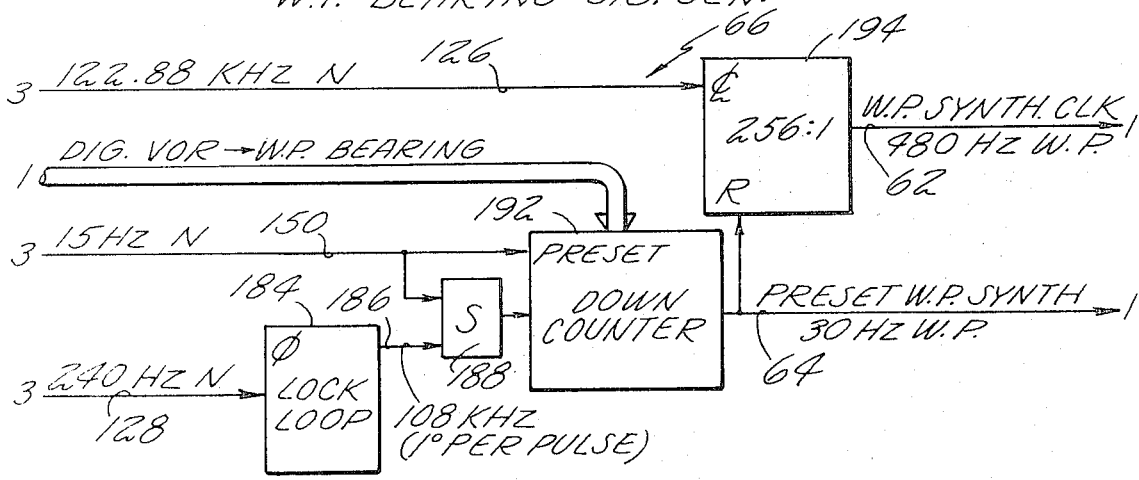
FIG. 5 is a schematic diagram of a waypoint bearing signal generator for use in the embodiment of FIG. 1.

The waypoint phasor synthesizer 60 is identical to the VOR phasor synthesizer 44, utilizing phase controlled clock and preset signals on the lines 62 and 64 which are generated in the waypoint bearing signal generator 66 which is illustrated in detail in FIG. 5. Therein, the 240 Hz north signal on the line 128 is applied to a phase locked loop 184 which generates a 108 KHz signal on a line 186, which represents 0.1° per pulse, and is therefore referred to the north reference within 0.1°. The 15 Hz north signal on the line 150, which is very accurately referred to the north reference, is applied along with the 108 KHz signal to a synchronizer circuit 188, to provide 0.1° clock pulses on a line 190 for advancing a down counter 192 which is preset once in each 30 Hz cycle by the rising edge of the 15 Hz north signal on the line 150. Then the 15 Hz north signal provides a gate to enable the 0.1° pulses to down-count the preset digital value representing the waypoint bearing to zero, at which time the preset waypoint synthesizer signal is generated on the line 64. The signal on the line 64 has a phase related to the digital presetting of the down counter 192, and therefore its phase is related to the north reference by the bearing of the waypoint from due north of the VOR station. This signal is used to clear a 256:1 countdown counter 194 which is clocked by the 122.88 KHz north signal on the line 126 so as to produce the 480 Hz waypoint signal which is used as the waypoint synthesizer clock on the line 62. Thus, the line 62 produces 16 pulses which are related in phase to the W. P. bearing. These pulses are utilized in the waypoint phasor synthesizer 60 (FIG. 1) in the same fashion that the variable phase signal generator outputs are used in the VOR phasor synthesizer which is described hereinbefore with respect to FIG. 6. Notice that the use of the 15 Hz north signal to control the presetting of the down counter 192 means that it will be preset only in every other 30 Hz time period, and its use to gate the 108 KHz signals on the line 186 through the synchronizer circuit 188 means that the down counter 192 is counted down only in every other 30 Hz period. Similarly the 256:1 countdown 194 is cleared only on every other 30 Hz period. However, when the waypoint is not changing, the 256:1 countdown 194 will roll through maximum count so as to produce one of the 480 Hz signals on the line 62 back to zero and continue counting over and over again. Thus, there is no need to reset it more than once every other cycle to be sure that the output is in phase with the 30 Hz waypoint signal on the line 64. Similarly, even though the synchronizing signal on the line 64 only appears in every other 30 Hz period, because the multiplexor 166 (FIG. 6) related to the waypoint synthesizer has a 16 bit counter, and will receive 16 pulses from on the 480 Hz waypoint signal line 62, it will advance through maximum setting back to zero and need not be preset in every cycle. In the worst case, if the waypoint is changed during a 30 Hz cycle, the change may not be effected until the second subsequent 30 Hz cycle, which is totally insignificant in the navigation of an aircraft.

As described briefly hereinbefore, the output of the VOR phasor synthesizer 44 on line 54 represents the vector from the VOR station to the aircraft, and the output of the waypoint synthesizer 60 on a line 58 represents a vector from the VOR to the waypoint. Subtraction of the aircraft vector from the waypoint vector produces a vector from the aircraft to the waypoint, which is represented by the phasor on the signal line 80 at the output of the summing amplifier 56.

One significant aspect of the present invention is that the utilization of the synthetic phasor generators (of the type shown in FIG. 6) produces substantially pure sinusoidal waves. This is due to the fact that there is substantially no harmonic content from the fundamental until the 15th harmonic, which contains only 6 percent of the fundamental; and the 17th contains 5 percent of the fundamental; the 31st contains 3 percent, and the 33rd harmonic contains about 3 percent. In other words, any sort of low pass filtering results in a substantially pure sinusoid. Further, addition of the two stepped waves, even though they are out of phase, is relatively immaterial because of the extremely low harmonic content, and the extreme high frequency of the harmonic content. Thus, this aspect of the present invention permits utilization of a simple low pass filter 82, rather than a relatively high Q band pass filter as is required in vector summation or phasor addition devices known to the art. Further, since the frequencies involved are not very critical, it is possible to pick an upper breakpoint frequency of the low pass filter 82 which is easily compensated for by introducing a phase lead in the phasor synthesizers 44, 60. Specifically, utilization of a double breakpoint around 100 Hz results in a phase lag of about 22.5°, which is accommodated as described hereinbefore by causing the all-zeros condition to represent the first step of the sinewave (22.5°).

Figure 8:
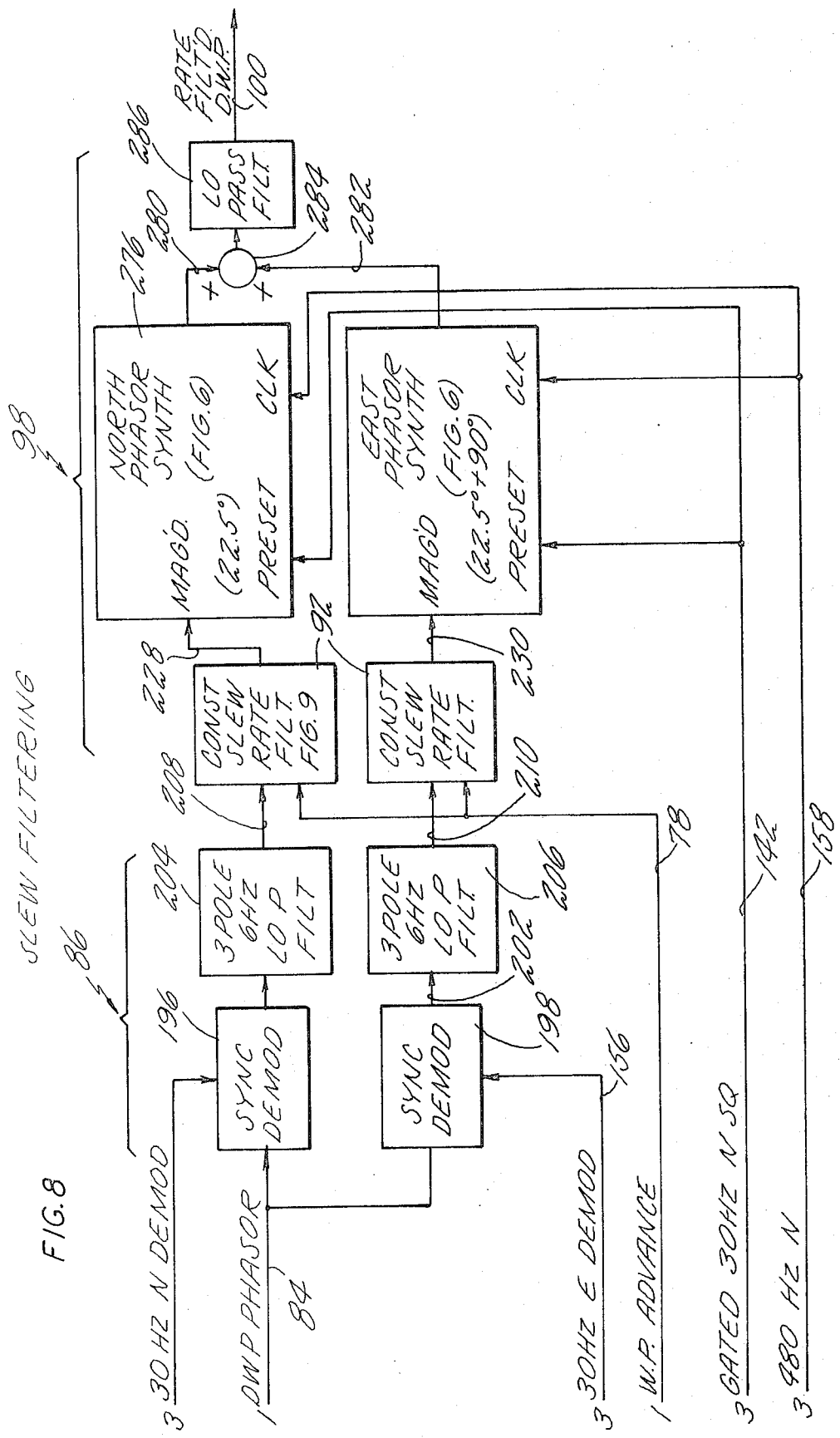
FIG. 8 is a simplified schematic block diagram of the slew filtering portion of the embodiment of FIG. 1.

The output of the low pass filter 82 comprises the distance-to-waypoint phasor on the signal line 84. In FIG. 8, this is applied to a pair of synchronous demodulators 196, 198, the reference inputs to which comprise the 30 Hz north demodulator signal on the line 146 and the 30 Hz east demodulator signal on the line 156. This resolves the distance-to-waypoint phasor on the line 84 into north and east coordinates on signal lines 200, 202, which after filtering in 3 pole, 6 Hz low pass filters 204, 206 are applied on signal lines 208, 210 to the constant slew rate filters 92 which are shown in detail in FIG. 9.

In FIG. 9, the constant slew rate filters 92 comprise a pair of rate limiting filters of a general type known to the prior art, with fast catch up provisions provided thereto in accordance with the present invention, and with a fast catch up timing system in accordance with the invention. The integrators 212, 214 are generally of the type illustrated in Best U.S. Pat. No. 3,373,675, and each comprises a high gain amplifier and limiter 216 driving an integrator comprised of a resistor 218, an operational amplifier 220, and a feedback capacitor 222. The output of the integrator is connected by a feedback path 224 to an input summing junction 226 of the high gain amplifier/limiter 216 for subtraction from the input voltage thereto supplied on either of the lines 208 or 210. The signal lines 224 are each connected to the rate filtered vector output lines 228, 230 which carry the rate filtered north vector and rate filtered east vector component, respectively.

A first modification to the constant slew rate filters 92 in accordance with the invention comprises the provision of an additional resistor 232 connected in series with an electronic switch, such as a FET 234, across the resistor 218. When the switches 234 are actuated, the resistors 232 are in shunt with the resistors 218, and these resistors are provided with a much smaller resistance (by several orders of magnitude) than the resistance of the resistors 218. This significantly reduces the time constant of the integrator portion of the rate limited filters 212, 214 so as to allow the outputs to vary at a rate greater than the constant slew rate designed into the filters for catching up. This may occur when a new VOR station is selected or when the waypoint is changed, so that the distance to the waypoint changes in a step function fashion by a very large amount. Such event is signaled by the appearance of the waypoint advance signal on the line 78, which sets a bistable device 236 thereby providing a signal on a line 238 which is passed through an OR circuit 240 to provide a fast filter catch up signal on a line 242 that actuates the electronic switches 234, decreasing the time constant, and allowing a rapid change in the output signals on the lines 228, 230 and on the feedbakc paths 224. The OR circuit 240 can also be operated by a signal on a line 244 which is provided by the output of a 256:1 counter 245 which is stepped at 30 Hz by a signal on a line 246, whenever a forced reset signal is not present on a line 248. Once the signal appears on the line 244 so that the OR circuit 240 provides a signal on a line 242, it is applied to an inverter 250 to block an AND circuit 242 so that the 30 Hz north squared signal on the line 122 is no longer passed over the line 246 to advance the countdown, whereby the last stage remains active and continues to provide the signal on the line 242. The 30 Hz north squared signal on the line 122 is simply used for convenience in this case, and any other 30 Hz source could be used, or source of a different frequency together with a different countdown could be used so as to provide either the 8 second time interval or some other time interval which may be deemed appropriate. The forced reset signal on the line 248 is generated by an inverter 254 in response to the lack of a signal from an OR circuit 256 which has three inputs. One of the inputs is the signal on the line 238 indicating that the waypoint has been changed. This causes the reset signal on the line 248 to disappear so that the counter 245 starts to count, and after counting halfway through, it generates a four second signal on a line 258 which is used to reset the bistable 236. If the filters have not caught up to the new waypoint by the end of 4 seconds, then apparatus (about to be described) which senses the fact that the filters are falling behind, will cause the countdown to continue so that after an additional four seconds, the eight second signal appears on the line 244 to again cause the generation of the fast filter catch up signal on the line 242. The fact that the filters are falling behind in keeping up with the input signal is determined by a pair of compare circuits, one of which 260 compares positive signals from the amplifiers 216 on lines 262, 264, isolated from each other by diodes 266, with the voltage of a positive limit reference source 268, and the other compare circuit 270 compares negative voltages on the lines 262, 264, isolated by diodes 272, with the voltage of a minus limit reference source 274. The output of the constant slew rate filters on the lines 228, 230 should be no higher than roughly the greatest speed of the aircraft; in other words, if one is flying directly to the waypoint, and directly on either the north or the east vector, then the greatest rate of change of that vector would be the speed of the aircraft. If the vectors, however, are changing at a rate greater than the anticipated maximum rate of change, which could occur as a result of VOR scalloping effects, (i.e. erroneous noise signals of an unreasonably high frequency nature) then the output of the slew rate filters would be limited to a maximum rate of change. Due to the fact that the vector outputs on lines 228, 230 are generated by the integrator circuits, the magnitude of the voltage on the lines 262, 264 is only a function of the difference between the input and the output. When the input changes at a rate no greater than a rate which the integrators can follow, the voltage on lines 262, 264 are proportional to the rate but less than the limits of 268 and 274; when the input changes at a faster rate, the summer 226 does not fully cancel, and the voltages on lines 262, 264 build up. Thus, the plus limit reference source 268 and minus limit reference source 274 can be selected to be something on the order of 5 or 10 percent lower than the slew rate maximum determined by the time constant of the integrator, so that when such a voltage is exceeded, the impending creation of an error can be sensed, and the filters can be switched into the fast catch up mode after a given time interval. This is achieved when either one of the compare circuits 260, 270 applies an output to the OR circuit 256 which removes the reset from the countdown 245 so that if the impending error persists for 8 seconds, then the filters will switch into the fast mode.

Thus, the constant slew rate filters 92 of FIG. 9 provide, in accordance with one aspect of the invention, for fast integration of both filters in response to a single timer having sensed that either of the filters is unable to respond rapidly enough to accommodate the change of input, and further provides for a step function compensation when waypoints are being advanced, by directly causing at least a 4 second fast filter catch up mode.

Returning now to FIG. 8, the outputs of the constant slew rate filters 92 on the lines 228, 230 are applied to the magnitude inputs of a north phasor synthesizer 276 and an east phasor synthesizer 278. The synthesizers 276, 278 operate in the same fashion as is described with respect to FIG 6 hereinbefore. Since the synthesizer 278 represents east and the synthesizer 276 represents north, the synthesizer 278 has to have a phase which is 90° advanced from that of the synthesizer 276. This is accommodated by providing for a preset to channel 3 by suitable internal wiring of the multiplexer 166 (FIG. 6) associated with the east phasor synthesizer 278. This is as is shown in illustration (d) of FIG. 7. Because of the preset, which is permissible since the phase difference between the two vectors is always constant, both of the synthesizers 276, 278 can utilize the same preset and clock signals, which comprise the gated 30 Hz north squared signal on the line 142 and the 480 Hz north signal on the line 158. The outputs of the synthesizers on lines 280, 282 are summed in a voltage summation amplifier 284, the output of which is passed through a low pass filter 286 for removal of the 15th, 17th, etc. harmonics (as described hereinbefore) so as to provide the rate filtered distance to waypoint phasor on the line 100.

In FIG. 10, the 30 Hz north signal on the line 30 is applied to the rotor 288 of an OBS resolver 290 which has a control 292 with which an operator can set the course upon which it is desired to approach the waypoint. This causes generation of signals relating to the sine and cosine of the desired course angle, α, in a pair of quadrature-related OBS resolver stators 294, 296 each of which is connected at one end to ground. The stator 294 produces a signal relating to the sine of the course angle on a line 298 and the stator 296 produces a signal relating to the cosine of the course angle on a line 300. These are connected to opposite ends of an RC bridge 302, the center of which comprises a signal relating to the sine of the carrier frequency plus the angle plus a 45° phase shift on a line 304. This is applied to a 30 Hz low pass filter 306 which itself provides a 45° phase lag so as to produce on a signal line 308 a signal relating to the sine of the carrier plus the course angle. This is applied to a wave squaring circuit 310 to provide a square wave on a line 312, the phase of which is advanced from north reference signals by the desired course angle. This signal is synchronized in a synchronizer circuit 314 with the 122.88 KHz north signal on the line 126 for application to a 4,096:1 counter 316 thereby to provide a 30 Hz signal on a line 318, the phase of which relates to the desired course angle as set by the control 292 in the OBS resolver 290. The next to last stage of the 4,096:1 counter 316 is tapped to provide a 60 Hz signal on a line 320 which is used to clock a D-type flip flop 222 gated by the 30 Hz signal on the line 318 so as to provide a 30 Hz signal on a line 224 which is advanced by 90° from the 30 Hz signal on the line 318. Thus, these signals can be used as reference inputs to a pair of synchronous demodulators 326, 328, the signal input of which is the rate-filtered distance-to-waypoint phasor on the line 100 so as to resolve the distance-to-waypoint phasor into along-track and cross-track vectors. A signal representing the along-track vector to the waypoint is provided by the synchronous demodulator 326 on a line 330 to a high gain amplifier 332 which operates as simply a polarity sensor so as to provide a signal of a suitable polarity to a polarity sensitive solenoid or the like, thus to operate the to/from indicator or flag 334, in a conventional fashion. The output of the synchronous demodulator 328 on a line 336 comprises the cross-track error which is passed through an amplifier 338 and utilized to energize a cross-track error indicator 340, which may simply comprise a galvanometer type of meter, or other suitable indicator.

The rate-filtered distance-to-waypoint phasor on the line 100 is also applied to a full wave rectifier 342, a low pass filter 344, and an A to D converter 346 to provide digital signals on a trunk of lines 348 to a digital distance-to-waypoint indicator 102. All of the functions in the apparatus of FIG. 10 are known in the art and form no part of the present invention, but are disclosed herein for completeness.

Thus, the various aspects of the present invention have been described, as illustrated in block form in FIG. 1. Various aspects of the invention may be utilized independently of other aspects, if desired. For instance, use of the synthetic generation of VOR and waypoint phasors, followed by a vector difference and low pass filtering to provide the distance-to-waypoint phasor may be utilized independently of other aspects of the invention. Similarly, utilization of the generation of a distance-to-waypoint phasor which is not slew rate filtered, followed by resolution of that phasor into orthogonal components, slew rate filtering, and reforming the slew rate filtered distance-to-waypoint phasor, may be utilized regardless of how the unfiltered distance-to-waypoint phasor is generated. Similarly, synthetic generation of the slew rate filtered distance-to-waypoint phasor from the filtered orthogonal components may or may not be utilized, while still taking advantage of the aspect of the invention relating to slew rate filtering of the resolved components of the distance-to-waypoint phasor. Also, the constant slew rate filter circuit of FIG. 9 may be utilized in other environments than the area navigation computer illustrated in FIG. 1. Similarly, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. An aircraft area navigation computer for use in conjunction with radio navigation ground stations, comprising:

means for providing clock signals the timing of which are indicative of the bearing of an aircraft to a radio navigation ground station and for providing a signal the magnitude of which is indicative of the distance of an aircraft to the ground station;

means responsive to said aircraft bearing and distance signals for synthesizing a stepped sinusoid the steps of which are synchronized to said aircraft bearing signals and the maximum amplitude of which is a function of said aircraft distance signal, thereby approximating a phasor representative of the vector position of the aircraft with respect to the ground station;

means for developing clock signals the timing of which are representative of the bearing of a designated waypoint with respect to the ground station and for developing a signal the magnitude of which is a representation of the distance between the designated waypoint and the ground station;

means responsive to said waypoint bearing and distance signals for synthetically generating a stepped sinusoid the steps of which are synchronized to said waypoint bearing signals and the maximum amplitude of which is a function of said waypoint distance signal, thereby approximating a phasor representative of the vector position of the waypoint with respect to the ground station; and means responsive to both said stepped sinusoids, including vector summation means and low pass filtering means, for providing a substantially pure sinusoidal phasor representing the vector position of the aircraft with respect to the waypoint.

2. An aircraft area navigation computer for use in conjunction with radio navigation ground stations, comprising:

first means for generating signals representative of the bearing and distance of the aircraft to a radio navigation ground station;

second means for presenting signals representative of the bearing and distance of a desired waypoint to the ground station;

means responsive to said first and second means for generating a phasor signal representing the vector position of the aircraft with respect to the desired waypoint;

resolution means responsive to said phasor signal for generating signals representative of the resolution of said phasor into a pair of orthogonal components;

constant slew rate filter means responsive to said orthogonal component signals for providing a pair of corresponding rate-limited orthogonal component signals; and means responsive to said rate-limited orthogonal component signals for generating a rate-limited phasor signal representative of the vector sum of said rate-limited orthogonal component signals, said phasor signal representing the vector position of the aircraft to the desired waypoint.

3. A navigation computer according to claim 2 further comprising:

means for developing a signal indicative of a change in the desired waypoint;

and wherein said constant slew rate filter means further comprises means responsive to said waypoint change signal to decrease the time constant of said constant slew rate filter means, thereby to increase the maximum rate limitation applied to said orthogonal component signals in the generation of said rate-limited orthogonal component signals.

4. The combination of:

means providing a pair of signals representing orthogonal components of a phasor indicative of the vector position of an aircraft with respect to a designated waypoint;

a pair of active rate limiting filters, each including an amplifier, each normally operable to provide a preselected limit on the rate of change of an output signal with respect to an input signal, each including selectively operable means to increase substantially the rate at which the output signal may change with respect to the input signal;

means responsive to the output signal and the input signal of each of said amplifiers for comparing the difference between the input and output of each amplifier with a predetermined limit and for generating an excess signal in response to said difference being greater than said predetermined limit; and timing means responsive to said excess signal for generating a signal for operating said selectively operable means in each of said active filters for a predetermined time interval following the occurrence of said excess signal and including means responsive to a signal indicative of a change in designated waypoint applied thereto for substantially instantaneously causing the generation of said operation signal for a predetermined time interval.

* * * * *